United States Patent Office 3,131,298
Patented Apr. 28, 1964

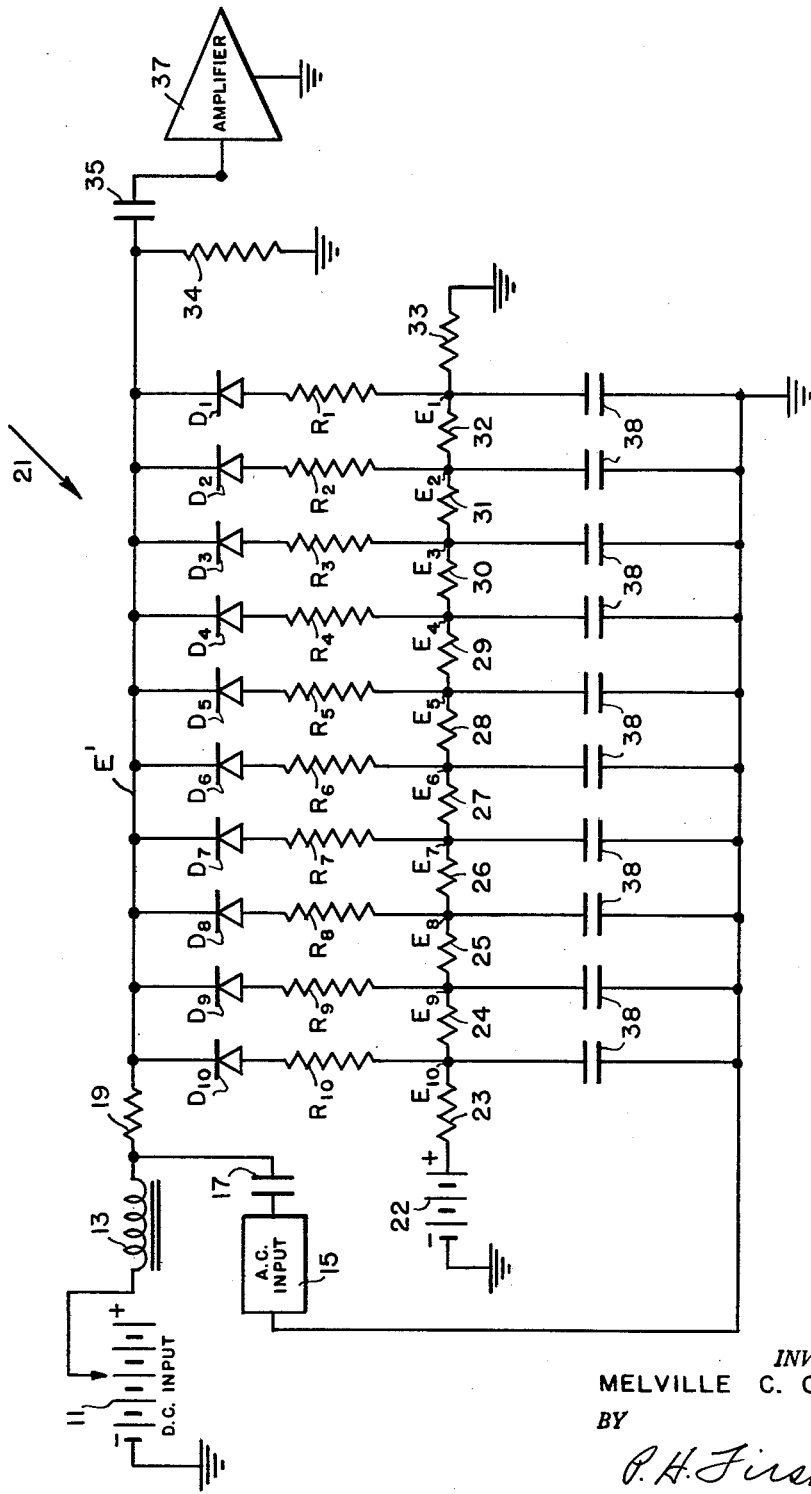

3,131,298
DIODE MULTIPLIER NETWORK
Melville C. Creusere, China Lake, Calif., assignor to the United States of America as represented by the Secretary of the Navy
Filed May 27, 1960, Ser. No. 32,493
1 Claim. (Cl. 235—194)
(Granted under Title 35, U.S. Code (1952), sec. 266)

The invention herein described may be manufactured and used by or for the Government of the United States of America for governmental purposes without the payment of any royalties thereon or therefor.

The present invention relates to electronic computers and more particularly to a new and improved electronic computer apparatus comprising an analogue operational multiplying circuit which receives A.C. and D.C. voltages and obtains the product thereof by the use of diode function shaping network sometimes referred to as a voltage compression network. Electronic computers are known wherein the product of two variables is obtained from the computer output. Computers performing this function have included, for example, servo multipliers in which the multiplication is achieved by use of a potentiometer the arm position of which is controlled by an input voltage to the servo unit thereof and by means of logarithmic multipliers in which logarithms of input and output voltages or currents are summed to zero by the operation of a feedback amplifier. The primary disadvantages of computers of this type have resided in the size and complexity of the units.

The present invention overcomes these disadvantages by utilizing a diode shaping network having a single choke and two condensers which are used for isolating the A.C. and D.C. voltages from each other at the input and output of the network. The A.C. current is superposed upon the D.C. current in the diode network when one or several diodes are conducting. The resistors and bias voltages of the network are selected so that the A.C. output voltage is approximately proportional to the D.C. input voltage. Since the A.C. output voltage is also proportional to the A.C. input voltage, the A.C. output voltage is proportional to the multiplication of the A.C. input voltage by the D.C. input voltage. It has been found that a unit of this type can be packaged in extremely small volume (less than two cubic inches) and the maximum error of the unit has been found to be less than two percent at full scale operation which is sufficient for many computing problems.

An object of the present invention is to provide a multiplying network which is of simple construction and utilizes very reliable components.

Another object is to obtain a multiplying network which can be packaged in an extremely small volume.

A further object is to obtain a multiplying network which has an error not greater than two percent at full scale operation.

A still further object is to obtain a multiplying network wherein an A.C. voltage is multiplied by a D.C. voltage by the use of a diode shaping network wherein no additional components except one choke and two condensers are used for the purpose of isolating the A.C. and D.C. voltages from each other at the output and input of the network.

Other objects and many of the attendant advantages of this invention will become readily appreciated as the same becomes better understood by reference to the following detailed description when considered in connection with the accompanying drawing wherein the figure is a schematic diagram of the analogue operational multiplying circuit of the present invention.

In the drawing is shown variable D.C. input 11, the negative end of which is connected to ground and the positive end connected to one end of choke coil 13. Variable A.C. input 15 is connected through capacitor 17 to the other end of choke coil 13. The function of choke coil 13 is to isolate the variable A.C. input from the variable D.C. input and the function of capacitor 17 is to isolate the variable D.C. input from the variable A.C. input, and choke coil 13 and capacitor 17 together serve as a summing network. Diode function shaping network 21 includes series connected resistor 19, parallel connected resistor 34, diodes $D_1$ through $D_{10}$, resistors $R_1$ through $R_{10}$ and positive bias voltages $E_1$ through $E_{10}$. Each of resistors $R_1$ through $R_{10}$ are connected in series with its corresponding diode and each individual diode and corresponding resistor are connected in parallel with the other diodes and corresponding resistors. Positive bias voltages $E_1$ through $E_{10}$, applied to the anodes of diodes $D_1$ through $D_{10}$, are provided by a voltage dividing network including potential source 22 which is connected in series with resistors 23 through 33. The A.C. and D.C. inputs are connected to diode shaping network 21 through resistor 19 and the A.C. output of the network is applied through D.C. blocking capacitor 35 to the input of high impedance amplifier 37. Capacitor 35 functions to isolate the D.C. circuit of amplifier 37 from the D.C. circuit of the diode multiplier. It is to be understood that capacitor 35 could be omitted if the device to which the A.C. output was applied did not feed back direct current to the multiplier output. Capacitors 38 are connected in series with each diode and corresponding resistor to provide a parallel circuit for the A.C. current. It is to be understood that capacitors 38 could be omitted from the circuit since the value of resistors 24 through 33 is small compared with the values of resistors $R_1$ through $R_{10}$. It is recognized that small error would be introduced into the circuit by omission of capacitors 38; however, for many applications this error is entirely permissible.

Series resistors $R_1$ through $R_{10}$ and bias voltage $E_1$ through $E_{10}$ may be calculated by use of the following formula:

$$G_n = \frac{G_s - nx\left(G_s + G_L + \sum_{m=n+1}^{M} G_m\right)}{nx}$$

$$E_n = \frac{E_{in}G_s + \sum_{m=n+1}^{M} G_m E_m}{G_s + G_L + \sum_{m=n+1}^{M} G_m}$$

wherein:

$n = 10, 9, 8, \ldots 1$ successively, of the resistor and voltage in question;
$M$ = number of diodes in the network;

$$x = \frac{G_s}{(M+1)(G_s + G_L)}$$

$E_m$ = voltage necessary to render diode $n+1$ conducting;
$E_{in}$ = D.C. input voltage;
$G_s$ = conductance of resistor 19;
$G_n$ = conductance of resistor in question;
$G_L$ = conductance of resistor 34;
$G_m$ = conductance of resistor $n+1$;
$E_n$ = voltage necessary to render the diode in question conducting.

In solving the above relationships, the values of resistors 19 and 34 are assumed. The solution of the conductance of the resistor in question, $G_n$, provides a slope that increases linearly with respect to the D.C. input voltage. Thus diode shaping network 21 has transfer characteristics that provide a rate of change of conductance that increases in approximately linear proportion to the amplitude of D.C. input voltage. Therefore, the solution of the resistances and bias voltages in question provides a diode network wherein the A.C. output voltage is approximately proportional to the D.C. input voltage. Furthermore, since the A.C. output voltage is also proportional to the A.C. input voltage, the A.C. output voltage, applied to amplifier 37, is proportional to the multiplication of the A.C. input voltage by the D.C. input voltage.

The following table shows, by way of example, the values of resistance and bias voltage which have been used in one embodiment of the diode network of the present invention:

| Reference numeral: | Resistance or power |
|---|---|
| 19 | ohms 100,000 |
| 34 | do 100,000 |
| $R_1$ | do 9,090 |
| $R_2$ | do 27,300 |
| $R_3$ | do 54,600 |
| $R_4$ | do 90,800 |
| $R_5$ | do 136,500 |
| $R_6$ | do 180,700 |
| $R_7$ | do 254,800 |
| $R_8$ | do 327,800 |
| $R_9$ | do 408,200 |
| $R_{10}$ | do 499,500 |
| $E_1$ | volts 8.54 |
| $E_2$ | do 8.81 |
| $E_3$ | do 9.22 |
| $E_4$ | do 9.77 |
| $E_5$ | do 10.5 |
| $E_6$ | do 11.3 |
| $E_7$ | do 12.2 |
| $E_8$ | do 13.3 |
| $E_9$ | do 14.5 |
| $E_{10}$ | do 15.9 |

The operation of the device is as follows: When a positive D.C. input voltage having a magnitude less than positive bias voltage $E_1$ is applied to the network, all diodes will conduct and the A.C. output voltage will be proportional to $R_p + (R_p + R_s)$ wherein $R_p$ is equal to the parallel resistance of resistors $R_1$ to $R_{10}$ and resistor 34, and $R_s$ is equal to the resistance of resistor 19. As the D.C. input voltage is increased to a positive potential such that voltage $E^1$ is slightly above the value of $E_1$, diode $D_1$ will stop conducting since its bias voltage is exceeded by the D.C. input voltage. When this occurs, the A.C. output voltage increases because the effective parallel resistance, $R_p$, is increased because resistor $R_1$ is no longer included in the parallel circuit. Similarly, a further increase in the A.C. output voltage occurs, as the D.C. input voltage is further increased since additional diodes are cut off as their bias voltages are exceeded by the D.C. input voltage $E^1$. It can therefore be seen that by properly adjusting the series resistances and bias points, as previously explained, the A.C. output voltage may be made approximately proportional to the D.C. input voltage and since the A.C. output voltage is proportional to the A.C. input voltage, the A.C. output voltage applied to amplifier 37 is proportional to the multiplication of the A.C. input voltage by the D.C. input voltage.

As previously explained, a slope that increases linearly with respect to the D.C. input voltage is obtained wherein the voltage output is linearly proportional to the product of the A.C. and D.C. input voltages. It is to be understood that this linear increasing slope can be modified in a predetermined manner such that the output voltage is a proportional product of the A.C. input voltage and a preselected function of the D.C. input voltage. This is accomplished by selecting values of resistors $R_1$ through $R_{10}$ and biases $E_1$ through $E_{10}$ so as to obtain a slope that varies with the predetermined function.

Obviously many modifications and variations of the present invention are possible in the light of the above teachings. It is therefore to be understood that within the scope of the appended claim the invention may be practiced otherwise than as specifically described.

What is claimed is:

A method of multiplying a multiplicand electrical signal by a multiplier electrical signal, one of said multiplicand and multiplier signals being represented by a variable D.C. voltage and the other by a variable first A.C. voltage, to obtain a product signal represented by a second A.C. voltage, and wherein the amplitude of the first A.C. voltage is appreciably smaller than the amplitude of the D.C. voltage, comprising the steps of:

(a) superposing the multiplicand and multiplier signals, one upon the other, thereby producing a superposed signal, (b) delivering the superposed signal to a variable conductance type diode-resistance voltage compression network, (c) selectively compressing the superposed signal within the voltage compression network by varying the conductance of the voltage compression network in direct proportion to the amplitude of said D.C. voltage thereby producing a variably compressed superposed signal, and (d) utilizing the A.C. voltage amplitude of the variably compressed superposed signal as a measure of said product.

References Cited in the file of this patent

UNITED STATES PATENTS

| 2,556,200 | Lesti | June 12, 1951 |
| 2,935,260 | Philbrick et al. | May 3, 1960 |
| 3,031,143 | McCoy et al. | Apr. 24, 1962 |